US 7,920,445 B2

(12) United States Patent
Shiono

(10) Patent No.: US 7,920,445 B2
(45) Date of Patent: Apr. 5, 2011

(54) OPTICAL DISC SIGNAL PROCESSING APPARATUS, AND MEDIUM HAVING PROGRAM RECORDED THEREON FOR CONTROLLING OPTICAL DISC APPARATUS

(75) Inventor: Hiroyuki Shiono, Ota (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 587 days.

(21) Appl. No.: 11/779,725

(22) Filed: Jul. 18, 2007

(65) Prior Publication Data

US 2008/0019234 A1   Jan. 24, 2008

(30) Foreign Application Priority Data

Jul. 19, 2006   (JP) .................................. 2006-196702

(51) Int. Cl.
*G11B 7/00*   (2006.01)
(52) U.S. Cl. ............... 369/44.25; 369/44.26; 369/59.17; 369/53.34
(58) Field of Classification Search .................. None
See application file for complete search history.

(56) References Cited

U.S. PATENT DOCUMENTS

| | | | | |
|---|---|---|---|---|
| 6,100,724 | A * | 8/2000 | Yoshimura et al. | 327/100 |
| 6,680,887 | B2 * | 1/2004 | Shihara et al. | 369/44.32 |
| 6,680,892 | B2 * | 1/2004 | Mashimo | 369/59.17 |
| 6,807,134 | B2 * | 10/2004 | Nakajima et al. | 369/47.35 |
| 7,012,872 | B2 | 3/2006 | Kuwayama | |
| 7,433,440 | B2 * | 10/2008 | Noguchi et al. | 375/371 |
| 7,483,361 | B2 * | 1/2009 | Miyata | 369/124.12 |
| 2003/0161350 | A1 * | 8/2003 | Wolf | 370/516 |
| 2005/0073932 | A1 * | 4/2005 | Shihara et al. | 369/59.21 |
| 2008/0019234 | A1 * | 1/2008 | Shiono | 369/44.25 |

FOREIGN PATENT DOCUMENTS

| | | |
|---|---|---|
| CN | 1306280 | 8/2001 |
| JP | 58-203635 | 11/1983 |
| JP | 11-134800 | 5/1999 |
| JP | 11-219566 | 8/1999 |
| JP | 3070194 | 4/2000 |
| JP | 2000-173168 | 6/2000 |
| JP | 2002-140819 | 5/2002 |
| JP | 2003-085886 | 3/2003 |
| JP | 2005-276289 | 10/2005 |
| KR | 1998-080386 | 11/1998 |
| KR | 2003-0074741 | 9/2003 |
| WO | WO 03/056558 | 7/2003 |

OTHER PUBLICATIONS

Korean Patent Office, Office action for application No. 10-2007-0072372, mail date Oct. 29, 2008.
Chinese Patent Office, Notification of Second Office Action for Application No. 2007101100562, Dated Aug. 28, 2009.
Chinese Patent Office, Notification of Third Office Action for Application No. 2007101100562, Dated Dec. 25, 2009.
Japan Patent Office, Notification of Reasons for Rejection for Japanese Application No. 2006-196702, Mail Date of Jun. 1, 2010.

* cited by examiner

*Primary Examiner* — Joseph Haley
*Assistant Examiner* — Ifedayo Iluyomade
(74) *Attorney, Agent, or Firm* — SoCal IP Law Group LLP; Steven C. Sereboff; John E. Gunther

(57) ABSTRACT

An optical disc signal processing apparatus comprising: a binarizing circuit configured to compare a level of an RF (Radio Frequency) signal obtained by photoelectrically converting a reflected light of a laser beam applied to an optical disc and a level of a DC signal, to output a binarized signal for reproducing information recorded on the optical disc, a level of the DC signal being adjusted to a level at which jitter included in the binarized signal is minimized.

3 Claims, 9 Drawing Sheets

US 7,920,445 B2

OPTICAL DISC SIGNAL PROCESSING APPARATUS, AND MEDIUM HAVING PROGRAM RECORDED THEREON FOR CONTROLLING OPTICAL DISC APPARATUS

CROSS-REFERENCE TO RELATED APPLICATION

This application claims the benefit of priority to Japanese Patent Application No. 2006-196702, filed Jul. 19, 2006, of which full contents are incorporated herein by reference.

BACKGROUND OF THE INVENTION

1. Field of the Invention

The present invention relates to an optical disc signal processing apparatus and a medium having a program recorded thereon for controlling an optical disc apparatus.

2. Description of the Related Art

Currently, optical disc apparatuses that reproduce information from an optical disc (such as CD (Compact Disc), DVD (Digital Versatile Disc)) are in widespread use. An optical disc apparatus emits a laser beam having the wavelength corresponding to the standard of an optical disc (CD: 780 nm to 790 nm, DVD: 650 nm to 660 nm etc.) and applies the laser beam to a track formed spirally in an information recording layer of the optical disc. An error correction code, modulation, etc., are applied to information, and pits respectively having mark lengths (3T to 11T) corresponding to a signal obtained as a result of the application are formed on the track of the optical disc. The optical disc apparatus produces an RF (Radio Frequency) signal by photo-electrically converting reflected light of the laser beam that have been applied to the track of the optical disc. The optical disc apparatus produces a binarized signal by comparing the level between the RF signal and a DC (Direct Current) signal at a predetermined level, in a binarizing circuit.

The production of the binarized signal based on the RF signal will be described hereinafter. When information is accurately recorded on the track of the optical disc, the RF signal has a waveform that is symmetrical about the intermediate level between the maximum level and the minimum level (hereinafter referred to as "symmetrical waveform") as shown in FIG. 10A. When the RF signal has a symmetrical waveform, at the intermediate level of the RF signal, jitter included in the binarized signal (fluctuation of the binarized signal on a time axis relative to a clock at a predetermined frequency generated to be phase-locked to the binarized signal (hereinafter referred to as "reproduction clock")) becomes minimum (the bottom jitter). To make the duty ratio between the high level and the low level of the binarized signal to be 50, the binarizing circuit produces a DC signal having the level equal to the intermediate level of the RF signal by feedback-controlling the binarized signal. That is, when the duty ratio of the binarized signal is 50 and the RF signal has a symmetrical waveform, the binarizing circuit produces the DC signal with the level at which the jitter included in the binarized signal is minimized. The optical disc apparatus executes a process to the binarized signal based on the reproduction clock, and applies demodulation, error correction, etc. It becomes possible therefore to execute excellent reproduction of the information, where the influence by the jitter is minimized (see Japanese Patent Application Laid-Open Publication No. 2005-276289).

However, there exists a low quality optical disc where the intermediate level of an RF signal is not the same as the level at which the jitter included in the binarized signal is minimized, due to recording error of information to the optical disc, etc. As an example, there exists an optical disc where the light amount of reflected light obtained from a pit having the mark length of 3T is smaller than the light amount of reflected light obtained when a pit having the mark length of 3T is accurately recorded, etc. In this case, the waveform of the RF signal becomes, for example, a waveform having a deviation in terms of symmetry (asymmetry), as shown in FIG. 10B, and the intermediate level of the RF signal does not become the same as the level at which the jitter included in the binarized signal is minimized. Therefore, in the binarizing circuit, when comparing the level between the RF signal and a DC signal having an intermediate level of an RF signal that is different from the level at which the jitter is minimized, the jitter included in the binarized signal may be increased. Therefore, the influence of the jitter in reproducing information based on this binarized signal is increased so that excellent reproduction of information may be difficult. Especially, for example, when many pits respectively having short mark lengths (such as 3T and 4T) are used to increase the information amount recorded in an optical disc, the above problem, caused by the difference between the intermediate level of the RF signal and the level at which the jitter included in the binarized signal is minimized, may be more serious.

SUMMARY OF THE INVENTION

An optical disc signal processing apparatus according to an aspect of the present invention, comprises: a binarizing circuit configured to compare a level of an RF (Radio Frequency) signal obtained by photoelectrically converting a reflected light of a laser beam applied to an optical disc and a level of a DC signal, to output a binarized signal for reproducing information recorded on the optical disc, a level of the DC signal being adjusted to a level at which jitter included in the binarized signal is minimized.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

An optical disc signal processing apparatus according to the present invention makes it possible to adjust the level of a DC signal of a binarizing circuit to the level at which jitter included in a binarized signal is minimized, to reproduce information from an optical disc.

First Embodiment

===Overall Configuration of Optical Disc Apparatus===

Figure 1:
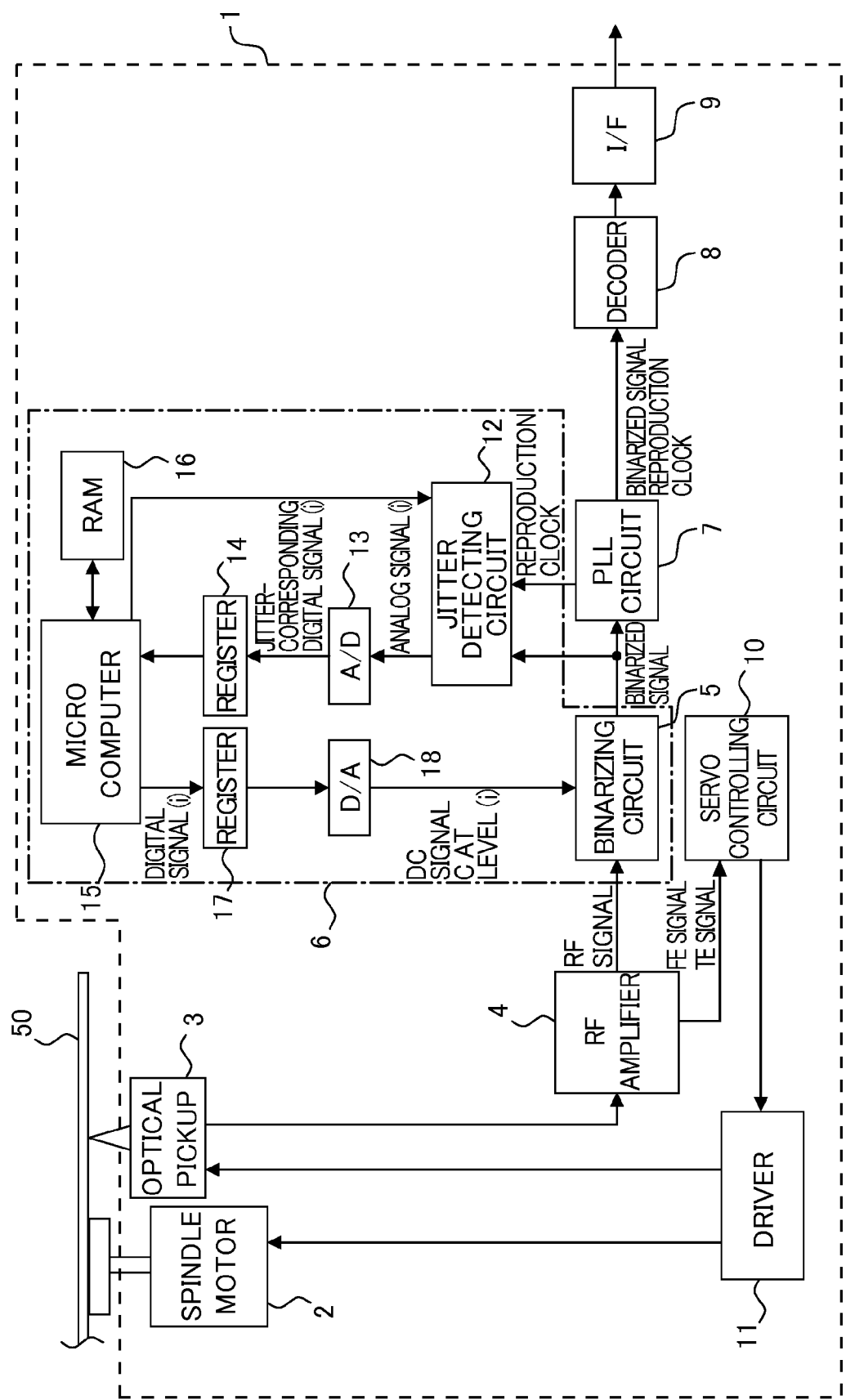
FIG. 1 is a functional block diagram of an overall configuration of an optical disc apparatus including an optical disc signal processing apparatus according to an embodiment of the present invention.
Figure 10A:
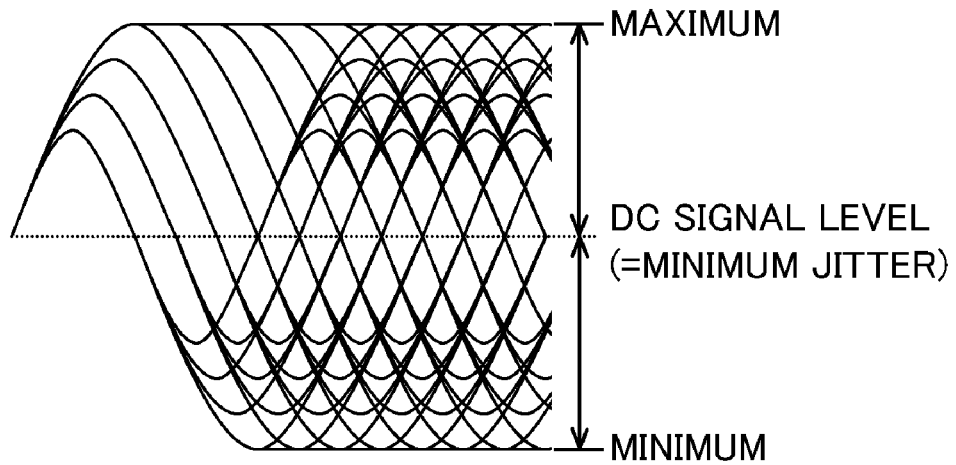
FIG. 10A is a waveform chart of an RF signal.
Figure 10B:
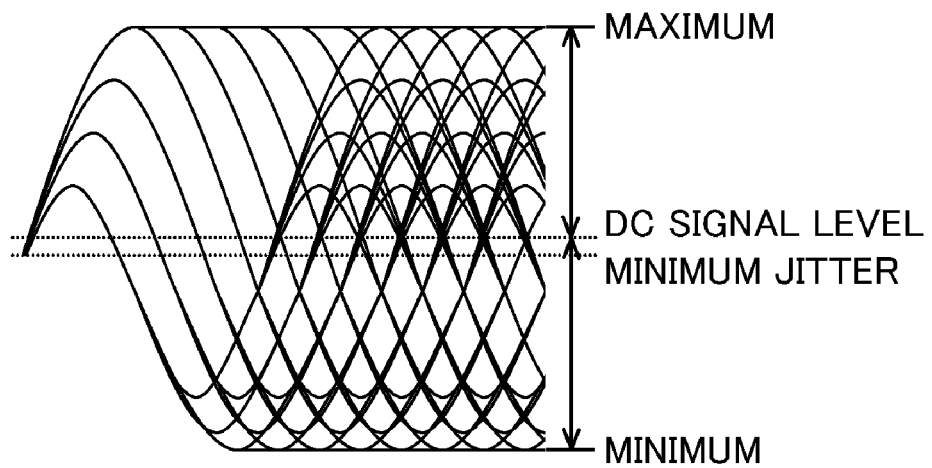
FIG. 10B is another waveform chart of an RF signal.

With Reference to FIG. 1, the overall configuration of an optical disc apparatus 1 including an optical disc signal processing apparatus 6 according to an embodiment of the present invention will be described hereinafter. FIG. 1 is a functional block diagram of an exemplary overall configuration of the optical disc apparatus 1. In an embodiment according to the present invention, an optical disc 50 storing information will be described as, for example, an optical disc according to the CD standard. However, the optical disc signal processing apparatus 6 according to an embodiment of the present invention may be applied to optical discs according to other standards (such as the DVD standard and the Blue-ray Disc (a registered trademark)). As shown in FIG. 10B, the optical disc 50 will be described assuming that information is recorded thereon such that the intermediate level of an RF signal is not the same as the level at which jitter included in a binarized signal is minimized.

The optical disc apparatus 1 includes a spindle motor 2, an optical pickup 3, an RF amplifier 4, an optical disc signal processing apparatus 6, a PLL (Phase Locked Loop) circuit 7, a decoder 8, an interface (I/F) 9, a servo controlling circuit 10, and a driver 11.

The spindle motor 2 is rotated when a controlling voltage is applied from the driver 11 to a spindle motor coil (not shown) at a rotation speed corresponding to the controlling voltage, thereby rotating the optical disc 50 mounted, for example, on a chucking mechanism (not shown) in a predetermined rotational direction.

The optical pickup 3 includes a semiconductor laser, various optical systems (such as a collimator lens and an anamorphic lens), an objective lens, a photo-detector, an actuator, etc., that are not shown. The semiconductor laser emits a laser beam having a wavelength (780 nm to 790 nm) corresponding to the standard of the optical disc 50. The laser beam passes through or is reflected from the various optical systems, to be gathered on a track formed spirally in an information recording layer of the optical disc 50, by an objective lens. Reflected light of the laser light having been applied to the track of the optical disc 50 enters the objective lens, passes through or is reflected from the various optical systems, and thereafter, is received by the photo-detector. The photo-detector photo-electrically converts the reflected light of the laser beam into a photo-electrically converted signal to be output to the RF amplifier 4.

The RF amplifier 4 amplifies the photo-electrically converted signal by a predetermined gain and applies a predetermined process to the amplified signal, to be output as an RF signal to a binarizing circuit 5 of the optical disc signal processing apparatus 6. The RF amplifier 4 also produces signals for various servo controls such as: a focus error (FE) signal for moving the objective lens in the focusing direction (optical axis direction) via the actuator of the optical pickup 3; a tracking error (TE) signal for moving the objective lens in the tracking direction (radial direction) via the actuator; and the like, based on the photo-electrically converted signal, so as to output those signals to the servo controlling circuit 10.

The servo controlling circuit 10 produces a focus controlling signal, a tracking controlling signal, etc., based on the signals for the various servo controls, to output those controlling signals to the driver 11. The servo controlling circuit 10 produces an FG (Frequency Generator) signal having a frequency corresponding to the rotation speed, based on a counter electromotive voltage generated by the rotation of the spindle motor 2. The servo controlling circuit 10 outputs to the driver 11 a rotation controlling signal for controlling the rotation of the spindle motor 2 at a rotation speed specified by controlling circuit (not shown) such as a CPU (Central Processing Unit) etc., based on the FG signal.

The driver 11 applies a controlling voltage to the actuator of the optical pickup 3 based on the focus controlling signal, the tracking controlling signal, etc. As a result, the objective lens is moved in the focusing direction so that the laser beam is focused on the track of the optical disc 50, and also the objective lens is moved in the tracking direction so that the laser beam follows the track of the optical disc 50. The driver 11 applies a controlling voltage to a spindle motor coil of the spindle motor 2 based on the rotation controlling signal. As a result, the spindle motor 2 is rotated at a rotation speed specified by the controlling circuit.

In an embodiment according to the present invention, a thread control, etc. to move the optical pickup 3 itself in the tracking direction are not disclosed as being irrelevant to the gist of the invention. However, a configuration and the like to execute the thread control, etc. may be added to the optical disc apparatus 1 as a matter of course.

The binarizing circuit 5 of the optical disc signal processing apparatus 6 compares the level between the RF signal from the RF amplifier 4 and a DC signal whose level is adjusted by an output of a DA (Digital Analog) converter 18 (an adjusting unit, a setting unit) described later, to output a binarized signal to the PLL circuit 7 and a jitter detecting circuit 12 (detecting unit). The detailed configuration, etc., of the binarizing circuit 5 will be described later.

The PLL circuit 7 is configured with, for example, a phase comparing circuit, a frequency-dividing circuit, a charge pump circuit, a low-pass filter, a VCO (Voltage Controlled Oscillator) circuit, etc. that are not shown. The PLL circuit 7 compares the phase of the binarized signal and the phase of a clock having a predetermined frequency, generates a reproduction clock to be phase-locked to the binarized signal, and outputs the binarized signal and the reproduction clock to the decoder 8. The PLL circuit 7 outputs the reproduction clock to the jitter detecting circuit 12.

The optical disc signal processing apparatus 6 detects jitter included in the binarized signal based on the binarized signal and the reproduction clock, and adjusts the level of the DC signal of the binarizing circuit 5 to the level at which the jitter included in the binarized signal is minimized. The detailed configuration, etc. of the optical disc signal processing apparatus 6 will be described later.

The decoder 8 produces a reproduced signal when the information was recorded on the track of the optical disc 50 by detecting the level of the binarized signal at the fall of the reproduction clock, for example. To this signal, the decoder 8 applies decoding processes such as a demodulating process (EFM (Eight Fourteen Modulation)) and an error correcting process (CIRC (Cross Interleaved Reed-Solomon Code)) corresponding to the standard of the optical disc 50. As a result, the information recorded in the optical disc 50 is reproduced.

The interface 9 is provided to transmit/receive information between, for example, a host computer (not shown) connected via a connecting terminal (not shown) and the optical disc apparatus 1. As this interface 9, there exists the ATAPI (AT Attachment Packet Interface) standard, the SCSI (Small Computer System Interface) standard, the IEEE (Institute of Electrical and Electronic Engineers) 1394 standard, the USB (Universal Serial Bus) standard, etc.

===Configuration, etc. of Optical Disc Signal Processing Apparatus 6===

Figure 2:
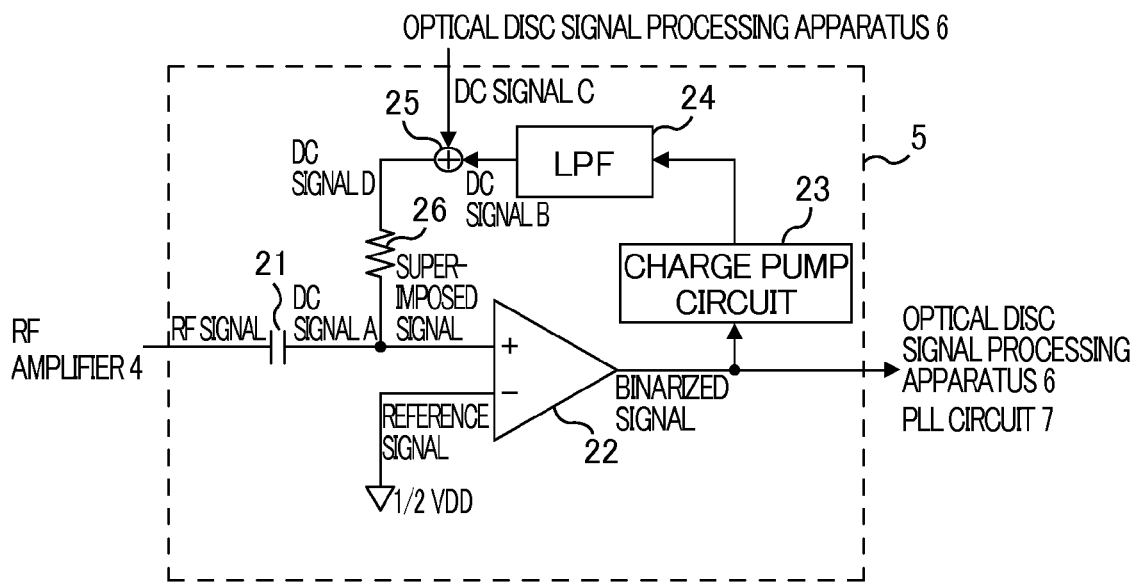
FIG. 2 is a circuit block diagram of a configuration of a binarizing circuit with which the optical disc signal processing apparatus is configured according to an embodiment of the present invention.
Figure 3:
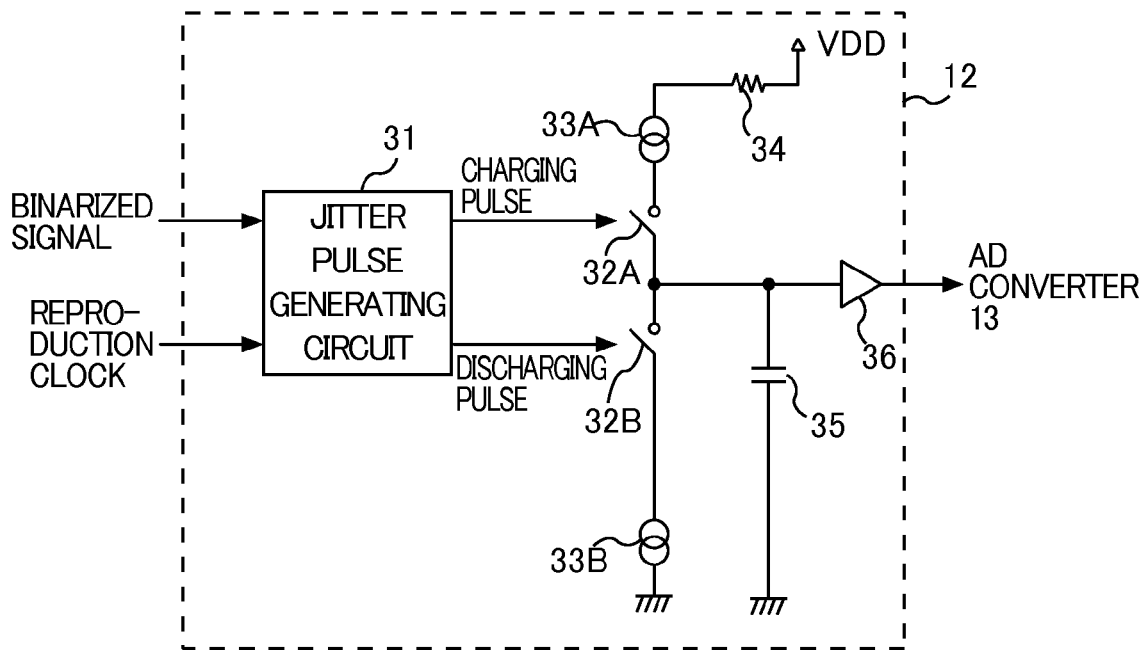
FIG. 3 is a circuit block diagram of a configuration of a jitter detecting circuit with which the optical disc signal processing apparatus is configured according to an embodiment of the present invention.
Figure 4:
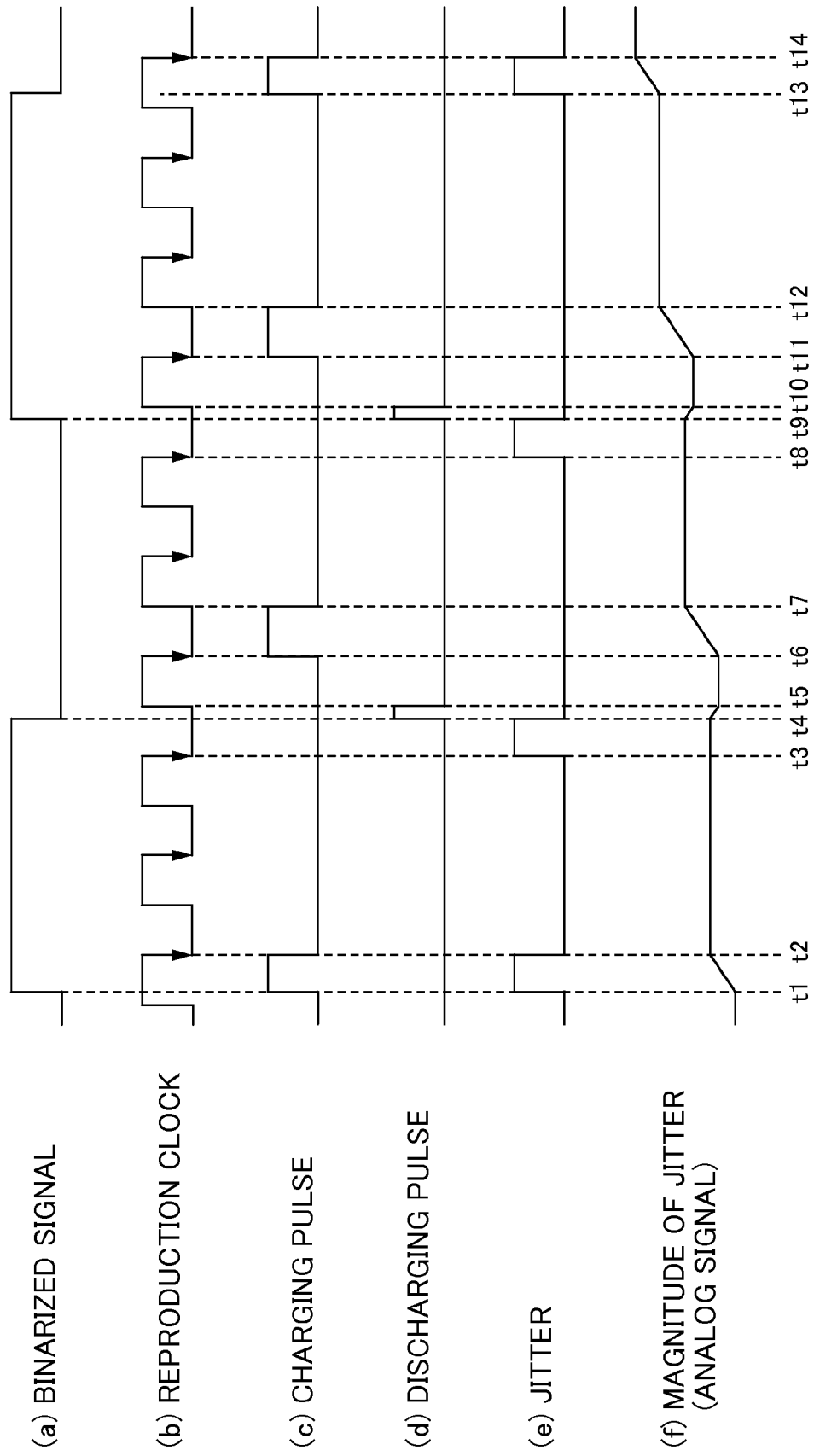
FIG. 4 is a waveform chart of essential waveforms in a jitter pulse producing circuit.

With Reference to FIGS. 1 to 4, the configuration, etc. of the optical disc signal processing apparatus 6 according to an embodiment of the present invention will be described hereinafter. FIG. 2 is a circuit block diagram of an exemplary configuration of the binarizing circuit 5. FIG. 3 is a circuit block diagram of an exemplary configuration of the jitter detecting circuit 12. FIG. 4 is a waveform chart of essential waveforms of the jitter pulse generating circuit 31 shown in FIG. 3.

The optical disc signal processing apparatus 6 includes the binarizing circuit 5, the jitter detecting circuit 12, the AD (Analog Digital) converter 13, registers 14 and 17 (the adjusting unit and the setting unit), a micro computer 15, a RAM (Random Access Memory) 16, and the DA converter 18.

<Configuration, etc. of Binarizing Circuit 5>

With Reference to FIG. 2, the configuration, etc. of the binarizing circuit 5 of the optical disc signal processing apparatus 6 according to an embodiment of the present invention will be described. The binarizing circuit 5 includes a capacitor 21, a comparing circuit 22, a charge pump circuit 23, a low-pass filter 24, an adding circuit 25, and a resistor 26.

The capacitor 21 is connected between the RF amplifier 4 and a positive input terminal of the comparing circuit 22. The capacitor 21 cuts a DC component of the RF signal from the RF amplifier 4 and provides an AC component of the RF signal to a positive input terminal of the comparing circuit 22.

The comparing circuit 22 has positive and negative input terminals: the positive input terminal receiving an input signal (hereinafter referred to as, "superimposed signal") generated by superimposing a DC signal (hereinafter referred to as "DC signal A") generated at one end of the resistor 26 described later on the AC component of the FR signal; the negative input terminal receiving an input signal (hereinafter referred to as "reference signal") from a power source voltage (½ VDD). The comparing circuit 22 compares the level of the superimposed signal and the level of the reference signal to output a binarized signal as a result of the comparison. More specifically, when the level of the superimposed signal is higher than the level of the reference signal, the comparing circuit 22 outputs a high level of the binarized signal and, when the level of the superimposed signal is lower than the level of the reference signal, outputs a low level of the binarized signal.

The charge pump circuit 23 decreases the amount of an electric current to be supplied to the low-pass filter 24, based on the high level of the binarized signal. The charge pump circuit 23 increases the amount of the electric current to be supplied to the low-pass filter 24, based on the low level of the binarized signal.

The low-pass filter 24 current-voltage converts the electric current from the charge pump circuit 23 into a DC signal (hereinafter referred to as "DC signal B") to be output.

The adding circuit 25 outputs a DC signal (hereinafter referred to as "DC signal D") obtained by adding the DC signal B from the low-pass filter 24 and a DC signal (hereinafter referred to as "DC signal C") from the DA converter 18 described later, to the resistor 26.

The resistor 26 is connected: at one end, to a connecting line between the capacitor 21 and the positive input terminal of the comparing circuit 22; and, at the other end, to an output of the adding circuit 25. The DC signal A is generated due to the voltage drop of the DC signal D corresponding to the resistance value of the resistor 26, to be superimposed on the AC component of the RF signal.

<Configuration, etc. of Optical Disc Signal Processing Apparatus 6 other than Binarizing Circuit 5>

With Reference to FIGS. 1, 3, and 4, the configuration, etc. other than the binarizing circuit 5, of the optical disc signal processing apparatus 6 according to an embodiment of the present invention will be described.

The jitter detecting circuit 12 is a circuit that detects jitter that is fluctuation of the binarized signal on a time axis relative to a reproduction clock and outputs an analog signal having a level corresponding to the magnitude of the jitter, to the AD converter 13. The jitter detecting circuit 12 will be described briefly hereinafter with reference to FIGS. 3 and 4, since it is described in detail in, for example, Japanese Patent Application Laid-Open Publication No. 2002-140819 already filed by the applicant of the present invention. The jitter circuit 12 includes a jitter pulse generating circuit 31, switching circuits 32A and 32B, constant current sources 33A and 33B, a resistor 34, a capacitor 35, and an amplifier circuit 36. The jitter pulse generating circuit 31 outputs high-level discharging pulses during the time between the change in level of the binarized signal and the rise of the reproduction clock (between t4 and t5, between t9 and t10), when the change in level of the binarized signal occurs during the time between the rise of the reproduction clock and the fall of the reproduction clock, as shown in FIG. 4(*d*). The jitter pulse generating circuit 31 also outputs high-level charging pulses during the time between the change in level of the binarized signal and the fall of the reproduction clock (between t1 and t2, between t13 and t14), when the change in level of the binarized signal occurs during the time between the rise of the reproduction clock and the fall of the reproduction clock, as shown in FIG. 4(*c*). The jitter pulse generating circuit 31 further outputs high-level charging pulses during the time between the fall of the reproduction clock and the rise of the reproduction clock immediately after the output of high-level discharging pulses (between t6 and t7, between t11 and t12). The switching circuit 32A is closed based on a high-level charging pulse. As a result, the capacitor 35 is supplied with an electric current from the constant current source 33A, to be charged. The switching circuit 32B is closed based on a high-level charging pulse. As a result, the charged voltage of the capacitor 35 is discharged via the constant current source 33B. The amplifying circuit 36 amplifies the charged voltage of the capacitor 35 with a predetermined gain. In this manner, with respect to the jitter shown in FIG. 4(*e*), an analog signal at the level corresponding to the magnitude of the jitter shown in FIG. 4(*f*) is output from the jitter detecting circuit 12, by controlling the open/close operations of the switching circuits 32A and 32B.

The AD converter 13 analog-digital converts the analog signal from the jitter detecting circuit 12 into a digital signal (hereinafter referred to as "jitter-corresponding digital signal") to be output. The register 14 holds the digital signal from the AD converter 13.

The micro computer 15 is configured with a CPU, a ROM (Read Only Memory), an interface, etc. that are not shown. The micro computer 15 sequentially outputs to the binarizing circuit 5 a plurality of the DC signals C with two adjacent levels thereof different from each other, to determine the level of the DC signal C at which the jitter indicated by the jitter-corresponding digital signal is minimized. As an exemplary timing of the micro computer 15 in sequentially outputting a plurality of the DC signals C with two adjacent levels thereof different from each other, there can be provided a timing of the rise of a frequency-dividing signal, where the frequency-dividing signal is obtained by frequency-dividing, with a predetermined frequency-dividing rate, a clock having a predetermined frequency that defines the timing of the operation of the micro computer 15. The output of a plurality of the DC signals C with two adjacent levels thereof different from each other from the micro computer 15 will be described in detail hereinafter. First, the micro computer 15, in order to output the DC signal C having a predetermined level (hereinafter referred to as "level (1)") to the binarizing circuit 5, writes a digital signal corresponding to the level (1) (hereinafter referred to as "digital signal (1)") into the register 17. The micro computer 15 reads from the register 14 a jitter-corresponding digital signal immediately after the output of the digital signal (1) (hereinafter referred to as "jitter-corresponding digital signal (1)"), and writes into the RAM 16 the read signal corresponding to the digital signal (1). The micro computer 15 writes a digital signal (2) corresponding to a level (2) into the register 17 in order to output to the binarizing circuit 5, for example, a DC signal C having the level (2) that is lower by a predetermined level than the level (1). The micro computer 15 reads from the register 14 the jitter-corresponding digital signal (2) immediately after the output of the digital signal (2), and writes into the RAM 16 the read signal corresponding to the digital signal (2). In this manner, the micro computer 15 sequentially outputs a plurality of digital signals corresponding to a plurality of DC signals C in order to output to the binarizing circuit 5 a plurality of DC signals C with two adjacent levels thereof different from each other by a predetermined level. Every time the micro computer 15 outputs each of the digital signals corresponding to each of the DC signals C, the micro computer 15 writes each the jitter-corresponding digital signal held by the register 14 into the RAM 16 corresponding to each of the digital signals. The micro computer 15 discriminates a jitter-corresponding digital signal that indicates the minimum jitter among a plurality of jitter-corresponding digital signals stored in the RAM 16. When discriminating the jitter-corresponding digital signal that indicates the minimum jitter, the micro computer 15 again outputs the digital signal corresponding to the jitter-corresponding digital signal. The micro computer 15 outputs to the jitter detecting circuit 12 a signal for stopping the jitter detecting operation thereof. The jitter detecting circuit 12 in an embodiment of the present invention is described as a circuit that stops the jitter detecting operation based on the signal from the micro computer 15. However, the circuit 12 is not limited to the above. For example, the jitter detecting circuit 12 may be so provided as to judge by itself that a time period has passed during which the micro computer 15 can discriminate the jitter-corresponding digital signal indicating the minimum jitter, to stop the jitter detecting operation. That is, the jitter detecting circuit 12 may be so provided as to complete the jitter detecting operation by itself. The predetermined level that is the level difference between any adjacent two levels of a plurality of DC signals C as mentioned above is set based on the result obtained through experiments, simulations, or operations etc., for example. The micro computer 15 in an embodiment of the present invention is described as a micro computer that sequentially outputs, for example, "21" digital signals with two adjacent levels thereof different from each other by the predetermined level.

The RAM 16 stores a plurality of jitter-corresponding digital signals, and a plurality of digital signals corresponding to a plurality of jitter-corresponding digital signals. The RAM 16 is configured with, for example, a volatile storage cell such as an SRAM (Static RAM) etc. The data stored in the RAM 16 is backed up by a backup power source. Though the RAM 16 is used in an embodiment of the present invention, the storage device is not limited to a RAM. There may be used an EEPROM (Electronically Erasable and Programmable ROM) (including a flash ROM) etc. that is configured with a non-volatile storage cell, and that data can be repeatedly written into and read from by erasing the data electrically.

The register 17 sequentially holds a plurality of digital signals from the micro computer 15. The DA converter 18 digital-analog converts a plurality of the digital signals held by the register 17 and sequentially outputs the DC signals C having levels corresponding to the conversion result to the binarizing circuit 5.

According to the above description, the micro computer 15 and the RAM 16 are components of the optical disc signal processing apparatus 6, and are connected to the registers 14 and 17 via a signal line; nevertheless, the configuration is not limited to the above. For example, the micro computer 15 and the RAM 16 may be so provided as to be separate from the optical disc signal processing apparatus 6, to process the signals via connection terminals.

===Operations of Optical Disc Signal Processing Apparatus 6===

Figure 5:
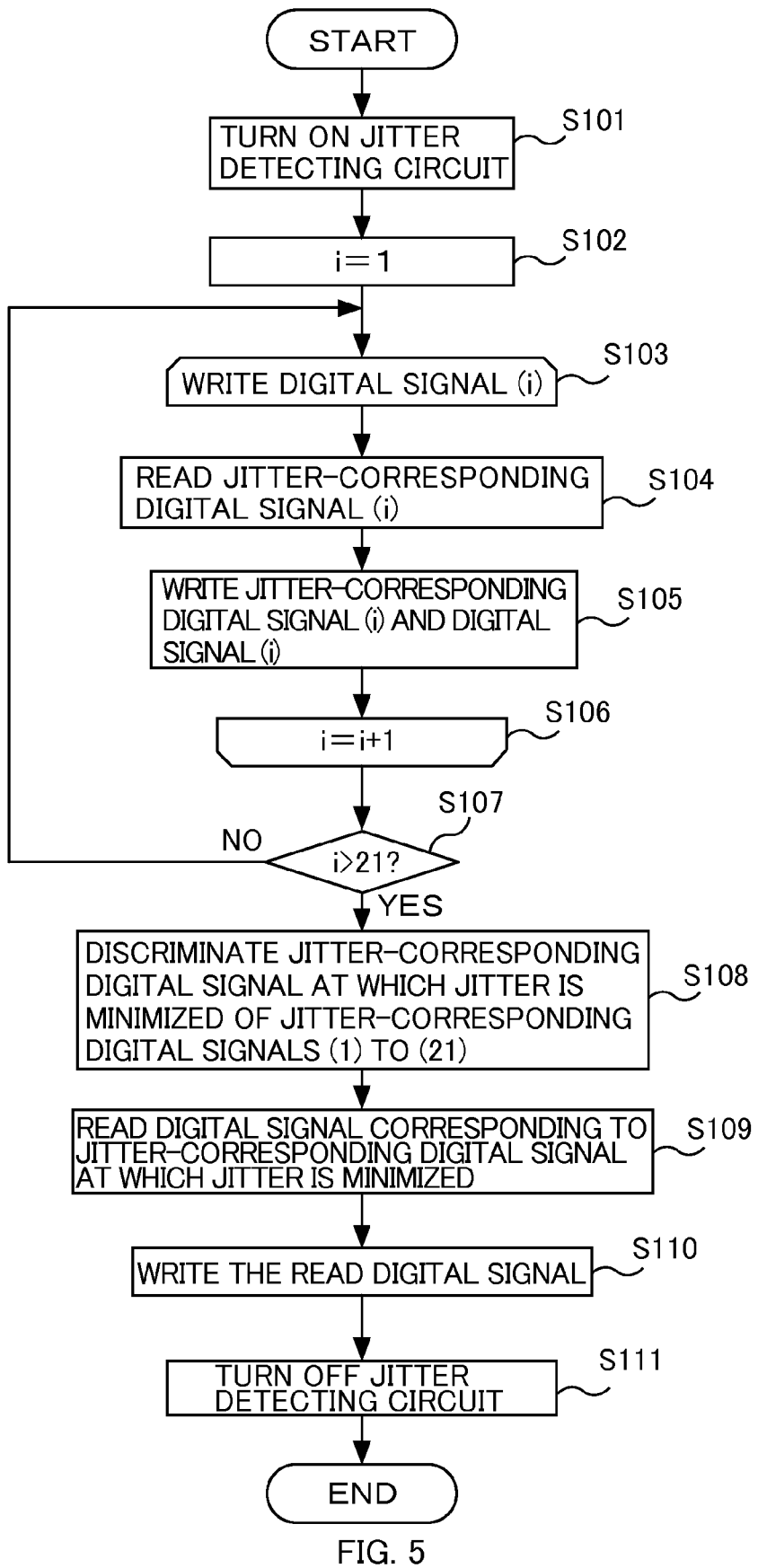
FIG. 5 is a flowchart of an operation of the optical disc signal processing apparatus according to an embodiment of the present invention.
Figure 6:
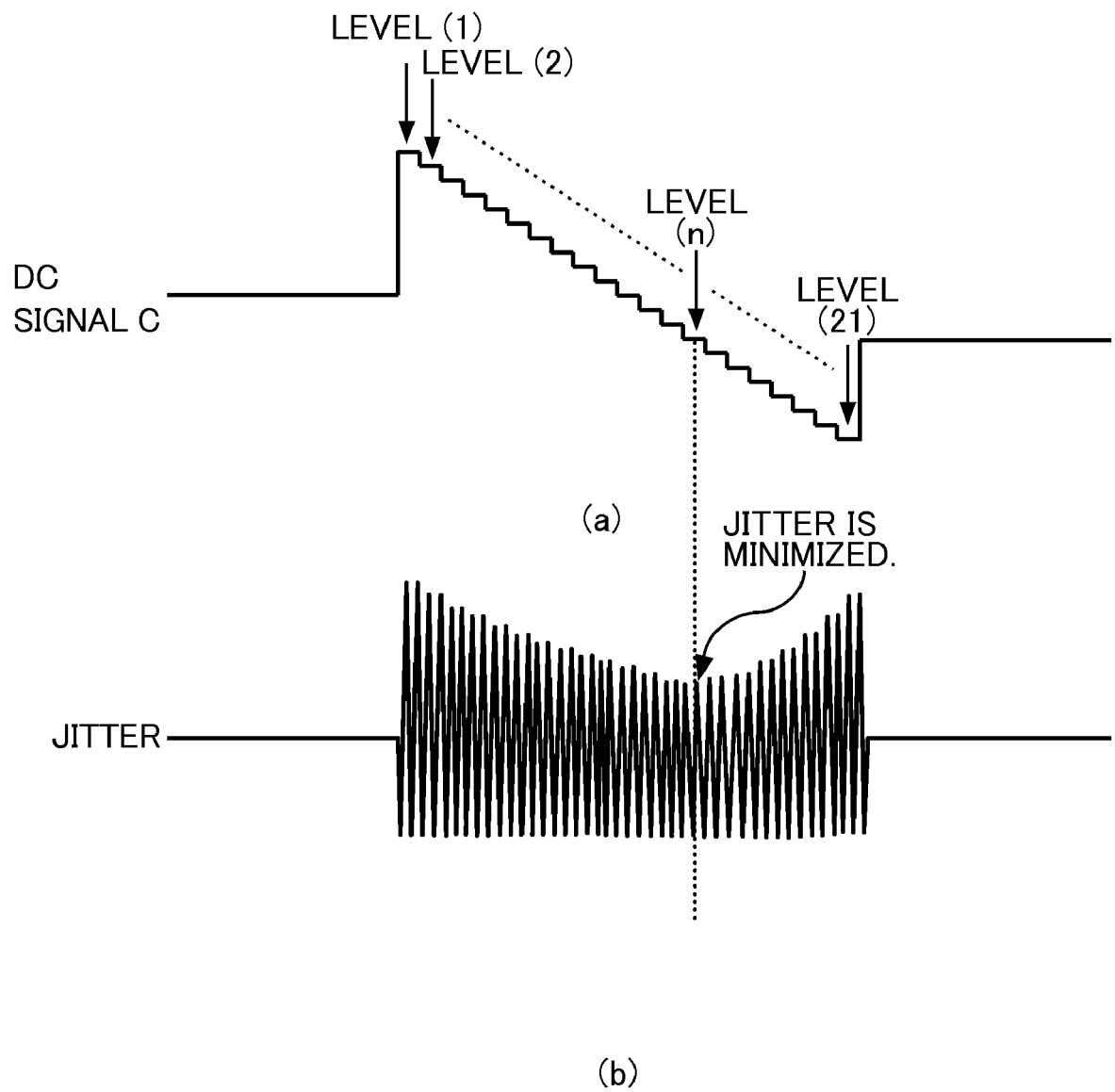
FIG. 6 is a waveform chart of a DC signal C and jitter.

Operations of the optical disc signal processing apparatus 6 according to an embodiment of the present invention will be described hereinafter with reference to FIGS. 5 and 6, and also to FIGS. 1 to 4 when necessary. FIG. 5 is a flowchart of operations of the optical disc signal processing apparatus 6 according to an embodiment of the present invention. FIG. 6 is a waveform chart showing a waveform (a) of the level of the DC signal C that the optical disc signal processing apparatus 6 outputs and a waveform (b) of the magnitude of the jitter that is detected in the jitter detecting circuit 12. The description will be made hereinafter assuming that, through the operation of each component of the above optical disc apparatus 1, a laser beam is applied to the track of the optical disc 50 and the RF amplifier 4 outputs the RF signal to the binarizing circuit 5.

The micro computer 15 turns on the jitter detecting circuit 12 for its detection of the jitter included in the binarized signal, for example, with the startup of the optical disc apparatus 1 (S101).

First, the micro computer 15 sets the variable i at "1" (i="1") in order to output the DC signal C having a level (1) to the binarizing circuit 5 (S102). Then the micro computer 15 writes a digital signal (1) corresponding to the level (1) into the register 17 (S103). The DA converter 18 digital-analog converts the digital signal (1) held by the register 17, into the DC signal C having the level (1), to be output to the binarizing circuit 5.

The adding circuit 25 of the binarizing circuit 5 outputs to the resistor 26 the DC signal D obtained by adding the DC signal C having the level (1) from the DA converter 18 and the DC signal B from the low-pass filter 24. With respect to the RF signal output from the RF amplifier 4, the DC component thereof is cut in the capacitor 21, and then the AC component thereof is supplied to the positive input terminal of the comparing circuit 22. As a result, the DC signal A corresponding to the DC signal C having the level (1) is superimposed on the AC component of the RF signal, and the superimposed signal corresponding to the DC signal C having the level (1) is input to the positive input terminal of the comparing circuit 22. The comparing circuit 22 compares the level between the superimposed signal corresponding to the DC signal C having the level (1) and the reference signal, and outputs a binarized signal corresponding to the DC signal C having the level (1) as a result of the comparison, to the charge pump circuit 23, the jitter detecting circuit 12, and the PLL circuit 7.

The charge pump circuit 23 increases or decreases the amount of electric current to be supplied to the low-pass filter 24, based on the binarized signal corresponding to the DC signal C having the level (1). The low-pass filter 24 current-voltage converts the electric current from the charge pump circuit 23 into the DC signal B to be output.

The PLL circuit 7 compares the phase between the binarized signal corresponding to the DC signal C having the level (1) and a clock having a predetermined frequency, and generates a reproduction clock to be phase-locked to the binarized signal corresponding to the DC signal C having the level (1). The PLL circuit 7 outputs the reproduction clock to the jitter detecting circuit 12 and also outputs the binarized signal corresponding to the DC signal C having the level (1) and the reproduction clock, to the decoder 8.

The jitter detecting circuit 12 detects the jitter included in the binarized signal corresponding to the DC signal C having the level (1), based on the binarized signal corresponding to the DC signal C at the level (1) and the reproduction clock, and outputs an analog signal having a level corresponding to the magnitude of the jitter. The AD converter 13 analog-digital converts the analog signal from the jitter detecting circuit 12 into a jitter-corresponding digital signal (1) to be held in the register 14. That is, the register 14 holds the jitter-corresponding digital signal (1) corresponding to the jitter included in the binarized signal at this time, based on the DC signal C having the level (1).

The micro computer 15 reads the jitter-corresponding digital signal (1) held by the register 14 (S104) and writes into the RAM 16 the signal corresponding to the digital signal (1) (S105). The micro computer 15 increments the variable i (S106) and judges whether the variable i has exceeded "21" (S107).

When judging that the variable i has not exceeded "21" (S107•NO), the micro computer 15 writes a digital signal (2) corresponding to a level (2) into the register 17, in order to output the DC signal C having the level (2) that is lower than the level (1) by a predetermined level to the binarizing circuit 5. As a result of execution of the same processes as above, the register 14 holds the jitter-corresponding digital signal (2) corresponding to the jitter included in the binarized signal at this time, based on the DC signal C having the level (2). By repeating the same processes as above until the variable i exceeds "21", the comparing circuit 22 compares the level between the superimposed signal corresponding to the DC signal C having the levels (1) to (21) (a certain range of levels) and the reference signal. The jitter detecting circuit 12 detects the jitter included in the binarized signals corresponding to the DC signals C having the levels (1) to (21). As a result, the RAM 16 stores the jitter-corresponding digital signals (1) to (21) and the digital signals (1) to (21) corresponding to the jitter-corresponding digital signals (1) to (21).

When judging that the variable i has exceeded "21" (S107•YES), the micro computer 15 discriminates a jitter-corresponding digital signal (n) that indicates the minimum jitter among the jitter-corresponding digital signals (1) to (21) (S108) (see FIG. 6). When discriminating the jitter-corresponding digital signal (n) that indicates the minimum jitter, the micro computer 15 reads a digital signal (n) corresponding to the jitter-corresponding digital (n) from the RAM 16 (S109). The micro computer 15 again writes the digital signal (n) into the register 17 (S110). As a result, the DC signal C having the level (n) at which the jitter included in the binarized signal is minimized is output to the binarizing circuit 5. Therefore, the comparing circuit 22 always outputs a binarized signal in which the jitter is minimized. After having written the digital signal (n) again, the micro computer 15 outputs to the jitter detecting circuit 12 a signal for stopping the jitter detecting operation of the jitter detecting circuit 12 (S111).

The PLL circuit 7 generates a reproduction clock to be phase-locked to the binarized signal based on the binarized signal in which the jitter is minimized, and outputs the binarized signal and the reproduction clock to the decoder 8. The decoder 8 applies a predetermined decoding process to the binarized signal in which the jitter is minimized, based on the reproduction clock. As a result, reproduction of the information recorded in the optical disc 50 is executed, where the influence of the jitter included in the binarized signal is minimized.

In the above embodiment, the DC signals C respectively having the levels (1) to (21) are output from the DA converter 18 to the binarizing circuit 5, by dropping the level thereof by the predetermined level from the level (1). However, it is not limitative. For example, the level may be raised by a predetermined level from the level (21) to the level (1). Otherwise, any of the DC signals C respectively having the levels (1) to (21) may be randomly output.

Though the levels (1) to (21) are used as the levels of the DC signals C in the above embodiment, it is not limitative. In order to discriminate more quickly the DC signal C having the level at which the jitter included in the binarized signal is minimized, for example, the number of levels in the range from the level (1) to the level (21) may be reduced. Otherwise, in order to determine more precisely the level of the DC signal C at which the jitter included in the binarized signal is minimized, for example, the number of levels in the range from the level (1) to the level (21) may be increased. Though the level of the DC signal C is adjusted using the levels (1) to (21) of which any two adjacent levels are different from each other by a predetermined level in the above embodiment, it is not limitative. For example, the level of the DC signal C may be adjusted using the levels (1) to (21) of which the differences between any two adjacent levels are sequentially deceased (or increased) or the levels (1) to (21) of which the differences between any two adjacent levels are randomly different from each other.

According to the above embodiment, reproduction of information from the optical disc 50 can be executed, where the level of the DC signal C can be set to be the level at which the jitter included in the binarized signal is minimized, and the influence of the jitter included in the binarized signal is also minimized. That is, excellent reproduction of information from the optical disc 50 can be executed, even when the waveform of the RF signal becomes a waveform having a deviation in terms of symmetry as shown in FIG. 10B, and the intermediate level of the RF signal and the level at which the jitter included in the binarized signal is minimized do not become the same.

The level of the DC signal C can be more securely adjusted to be the level (n) at which the jitter included in the binarized signal is minimized, by any of the jitter-corresponding digital signals (1) to (21) obtained based on the DC signal C, the level of which is adjusted to any of the levels (1) to (21) within a certain range of level.

The jitter included in the binarized signal can be securely detected, based on the binarized signal and the reproduction clock generated to be phase-locked to the binarized signal. As a result, the level of the DC signal C can be securely adjusted to the level (n) at which the jitter included in the binarized signal is minimized.

The power consumption, etc. of the jitter detecting operation of the jitter detecting circuit 12 can be reduced, by stopping the jitter detecting operation of the jitter detecting circuit 12 after adjusting the level of the DC signal C to the level (n) at which the jitter included in the binarized signal is minimized.

The above process to adjust the level of the DC signal C to the level (n) at which the jitter included in the binarized signal is minimized can be executed as a software process by, for example, programming the process in advance into the ROM of the micro computer 15.

Second Embodiment

Configuration of Optical Disc Signal Processing Apparatus

Figure 7:
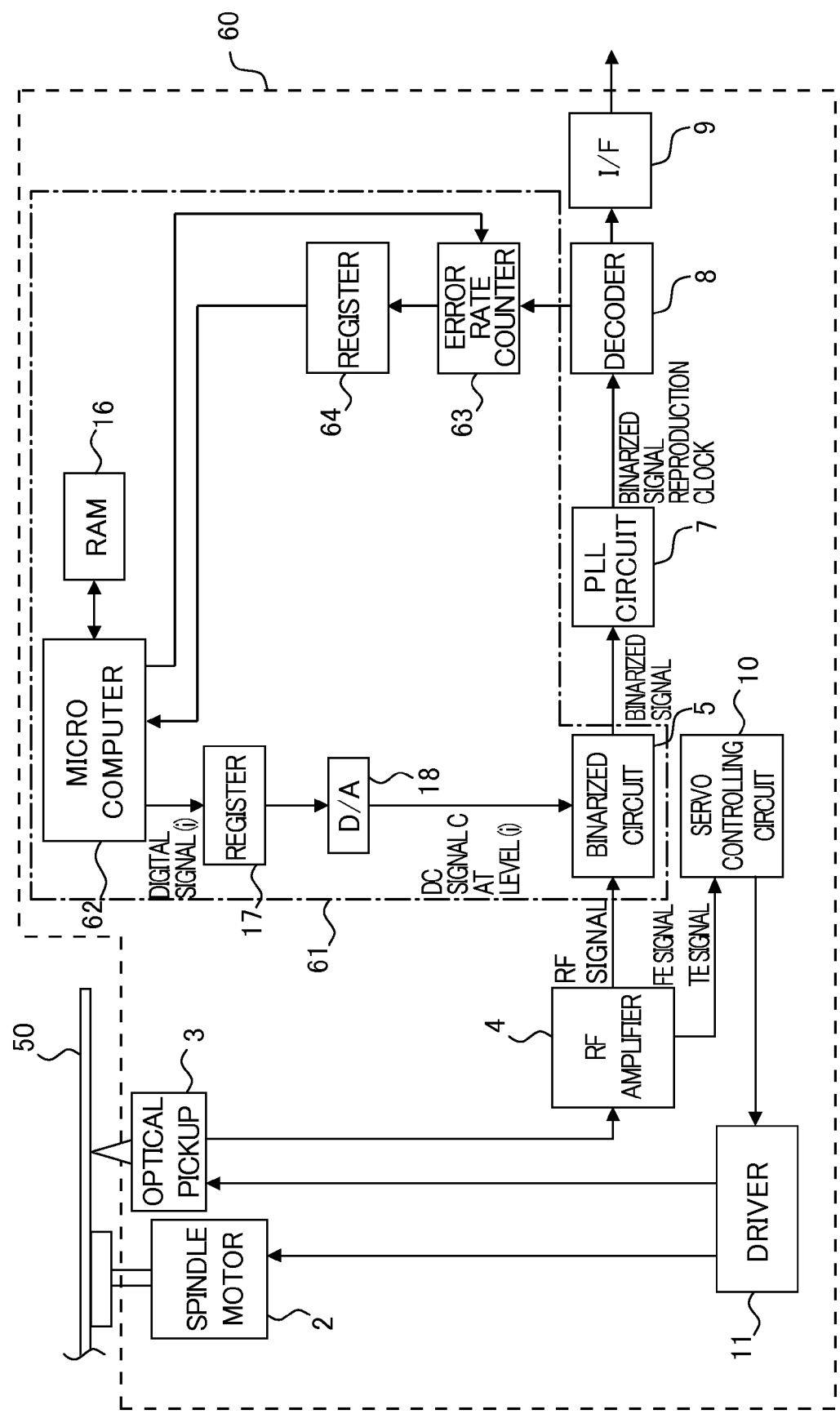
FIG. 7 is a functional block diagram of an overall configuration of an optical disc apparatus including the optical disc signal processing apparatus according to an embodiment of the present invention.

With reference to FIG. 7, the overall configuration of an optical disc signal processing apparatus 61 according to an embodiment of the present invention will be described hereinafter. FIG. 7 is a functional block diagram of an exemplary overall configuration of an optical disc apparatus 60 including the optical disc signal processing apparatus 61 according to an embodiment of the present invention. In the optical disc apparatus 60, its components similar to those of the optical disc apparatus 1 shown in FIG. 1 are given the same reference numerals and the description thereof is omitted.

The optical disc signal processing apparatus 61 includes an error rate counter 63, registers 64 and 17, a micro computer 62, a RAM 16, and a DA converter 18.

The error rate counter 63 counts up, every time the decoder 8 corrects an error (error rate) of a reproduced signal subjected to the EFM demodulating process with respect to the signal recorded in the optical disc 50, in the CIRC error correction process applied to the above reproduced signal, where the CIRC error correction process corresponds to the standard of the optical disc 50. As a result, the count value of the error rate counter 63 represents the number of error of the reproduced signal with respect to the signal recorded in the optical disc 50, where the reproduced signal occurs based on the binarized signal. As the decoder 8 and the error rate counter 63, a decoder and an error rate counter as described in Japanese Patent Application Laid-Open Publication No. 11-110922 may be used, for example. As described in the above patent publication, the count value of the error rate counter 63 is generally used for boost adjustment of the RF amplifier 4, etc.

The register 64 holds the count value of the error rate counter 63.

The micro computer 62 sequentially outputs to the binarizing circuit 5 a plurality of DC signals C with two adjacent levels thereof different from each other, to determine the level of the DC signal C at which the count value held by the register 64 is minimized. The relation between the count value of the error rate counter 63 and the jitter included in the binarized signal will be described hereinafter. When the jitter included in the binarized signal is large, there is also increased naturally the number of error of the reproduced signal that occurs based on the binarized signal, with respect to the signal recorded in the optical disc 50. That is, the count value of the error counter 63 is increased. Whereas, when the jitter included in the binarized signal is minimized, there is also substantially minimized the number of error of the reproduced signal that occurs based on the binarized signal, with respect to the signal recorded in the optical disc 50. In an embodiment according to the present invention, the level of the DC signal C at which the jitter included in the binarized signal is minimized is determined by determining the minimum of the count value held by the register 64. Outputting sequentially from the micro computer 62 a plurality of DC signals C with two adjacent levels thereof different from each other, is similar to that in the first embodiment described above; except that the micro computer 62 resets the count value of the error rate counter 63 every time the micro computer 62 sequentially outputs a plurality of the DC signals C with two adjacent levels thereof different from each other.

===Operations of Optical Disc Signal Processing Apparatus 61===

Figure 8:
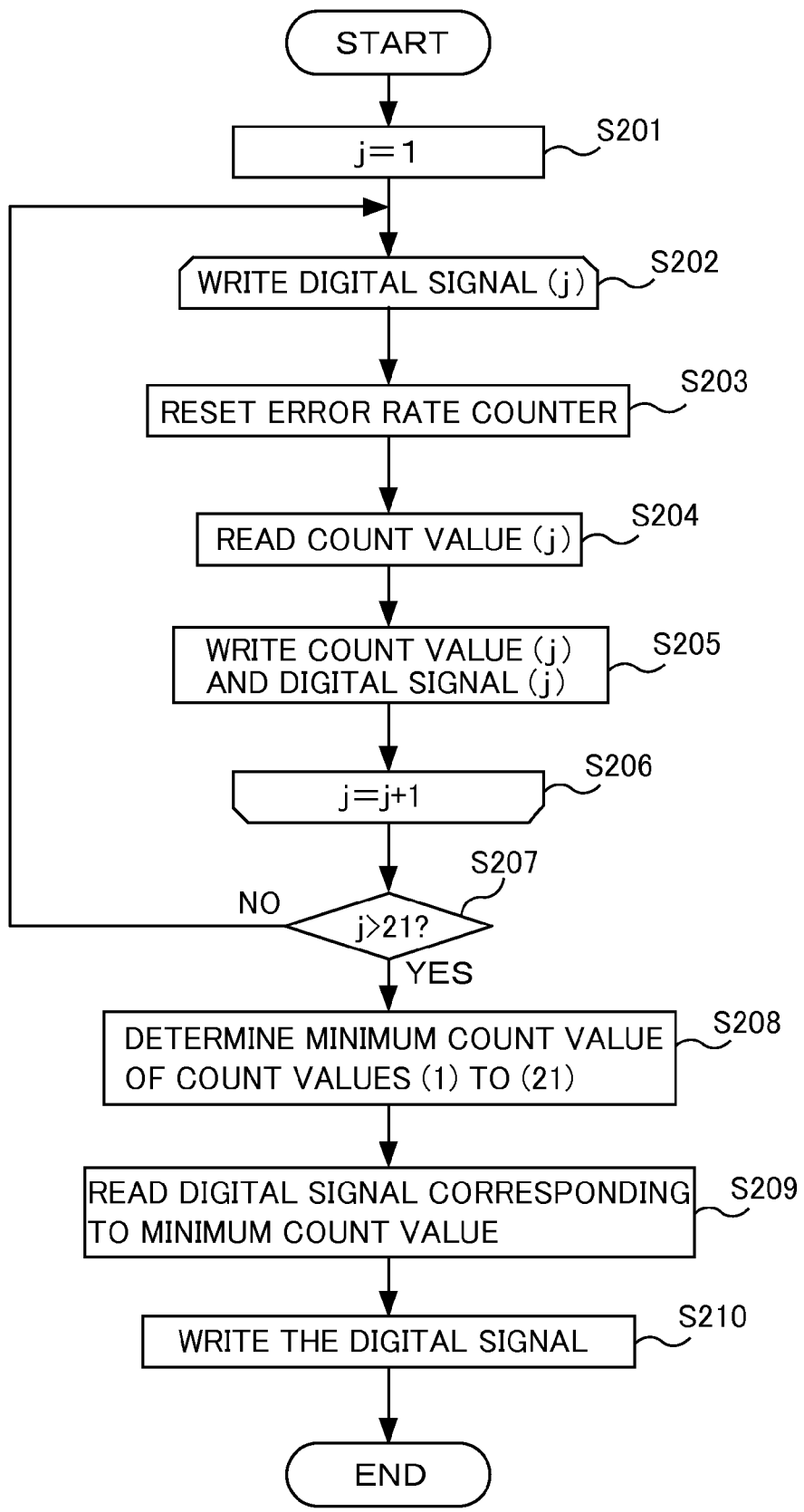
FIG. 8 is a flowchart of an operation of the optical disc signal processing apparatus according to an embodiment of the present invention.

With reference to FIG. 8, the optical disc signal processing apparatus 61 according to an embodiment of the present invention will be described hereinafter, further with reference to FIG. 7 when necessary. FIG. 8 is a flowchart of operations of the optical disc signal processing apparatus 61 according to an embodiment of the present invention. The description will be made assuming that a laser light beam is applied to the track of the optical disc 50 and the RF amplifier 4 outputs the RF signal to the binarizing circuit 5 through the operation of components of the optical disc apparatus 60.

First, the micro computer 62 sets the variable j at "1" (j="1") in order to output the DC signal C having the level (1) to the binarizing circuit 5 (S201). Then the micro computer 62 writes a digital signal (1) corresponding to the level (1) into the register 17 (S202). The micro computer 62 transmits to the error rate counter 63 a controlling signal for resetting the count value of the error rate counter 63 (S203).

The DA converter 18 digital-analog converts the digital signal (1) held by the register 17, into the DC signal C having the level (1), to be output to the binarizing circuit 5.

The adding circuit 25 of the binarizing circuit 5 outputs to the resistor 26 the DC signal D obtained by adding the DC signal C having the level (1) from the DA converter 18 and the DC signal B from the low-pass filter 24. With respect to the RF signal output from RF amplifier 4, the DC component thereof is cut in the capacitor 21, and then the AC component thereof is supplied to the positive input terminal of the comparing circuit 22. As a result, the DC signal A corresponding to the DC signal C having the level (1) is superimposed on the AC component of the RF signal, and the superimposed signal corresponding to the DC signal C having the level (1) is input to the positive input terminal of the comparing circuit 22. The comparing circuit 22 compares the level between the superimposed signal corresponding to the DC signal C having the level (1) and the reference signal, and outputs a binarized signal corresponding to the DC signal C having the level (1) as a result of the comparison, to the charge pump circuit 23 and the PLL circuit 7.

The charge pump circuit 23 increases or decreases the amount of electric current to be supplied to the low-pass filter 24, based on the binarized signal corresponding to the DC signal C at the level (1). The low-pass filter 24 current-voltage converts the electric current from the charge pump circuit 23 into the DC signal B to be output.

The PLL circuit 7 compares the phase between the binarized signal corresponding to the DC signal C having the level (1) and a clock having a predetermined frequency, and generates a reproduction clock to be phase-locked to the binarized signal corresponding to the DC signal C having the level (1). The PLL circuit 7 outputs the reproduction clock to the jitter detecting circuit 12 and also outputs the binarized signal corresponding to the DC signal C having the level (1) and the reproduction clock to the decoder 8.

The decoder 8 generates a reproduced signal by detecting the level of the binarized signal at the fall of the reproduction clock. The decoder 8 applies the EFM demodulation process to the reproduced signal. The decoder 8 further applies the CIRC error correction process corresponding to the standard of the optical disc 50 to the reproduced signal subjected to the EFM demodulating process.

The counter value of the error counter 63 is reset based on the controlling signal from the micro computer 62. The error rate counter 63 counts up every time the decoder 8 corrects an error of a reproduced signal subjected to the EFM demodulating process with respect to the signal recorded in the optical disc 50. That is, the error rate counter 63 counts the number of errors of the reproduced signal that occurs based on the binarized signal corresponding to the DC signal C having the level (1), with respect to the signal recorded in the optical disc 50. The registers 64 holds the count value of the error rate counter 63.

The micro computer 62 reads a count value (1) from the register 64 (S204) and writes into the RAM 16 the read value corresponding to the read value with the digital signal (1) (S205). The micro computer 62 increments the variable j (S206) and judges whether the variable j has exceeded "21" (S207).

When judging that the variable j has not exceeded "21" (S207•NO), the micro computer 62 writes a digital signal (2) corresponding to the level (2) into the register 17, in order to output the DC signal C having the level (2) that is lower than the level (1) by a predetermined level to the binarizing circuit 5 (S202). The micro computer 62 transmits to the error rate counter 63 a controlling signal for resetting the count value of the error rate counter 63 (S203). As a result of execution of the similar processes to the above, the error rate counter 63 counts the number of errors of the reproduced signal that occurs based on the binarized signal corresponding to the DC signal C having the level (2), with respect to the signal recorded in the optical disc 50. By repeating the similar process to the above until the variable j exceeds "21", the comparing circuit 22 compares the level between the superimposed signal corresponding to the DC signals C having the levels (1) to (21) (a certain range of levels) and the reference signal. The error rate counter 63 counts the number of error of the reproduction clock that occurs based on the binarized signal corresponding to the DC signals C having the levels (1) to (21), with respect to the signal recorded in the optical disc 50. As a result, the RAM 16 stores the count values (1) to (21) and the digital signals (1) to (21) corresponding to the count values (1) to (21).

When judging that the variable j has exceeded "21" (S207•YES), the micro computer 62 determines the minimum count value of the count values (1) to (21) (S208). When determining the minimum count value (n), the micro computer 62 reads from the RAM 16 a digital signal (n) corresponding to the minimum count value (n) (S209). The micro computer 62 again writes the digital signal (n) into the register 17 (S210). As a result, the DC signal C having the level (n) at which the count value of the error rate counter 63 is minimized, is output to the binarizing circuit 5. That is, the DC signal C having the level (n) at which the jitter included in the binarized signal is minimized, is output to the binarizing circuit 5. Therefore, the comparing circuit 22 always outputs a binarized signal at which the jitter is minimized.

The PLL circuit 7 generates a reproduction clock to be phase-locked to the binarized signal based on the binarized signal at which the jitter is minimized, to output the binarized signal and the reproduction clock to the decoder 8. The decoder 8 applies a predetermined decoding process to the binarized signal at which the jitter is minimized, based on the reproduction clock. As a result, reproduction of the information recorded in the optical disc 50 is executed, where the influence of the jitter included in the binarized signal is minimized.

In the above embodiment, the DC signals C respectively having the levels (1) to (21) are output from the DA converter 18 to the binarizing circuit 5, by dropping the level thereof by the predetermined level from the level (1). However, it is not limitative. As shown in the first embodiment, the level of the DC signal C can be varied variously.

According to the above embodiment, the level of the DC signal C can be more securely adjusted to be the level (n) at which the jitter included in the binarized signal is minimized, by the count value of the error rate counter 63 obtained based on the DC signal C, the level of which is adjusted to any of the levels (1) to (21) within a certain range of level.

Other Embodiments

The above embodiments of the present invention are simply for facilitating the understanding of the present invention and are not in any way to be construed as limiting the present invention. The present invention may variously be changed or altered without departing from its spirit and encompass equivalents thereof.

<Operations of Optical Disc Signal Processing Apparatus 6>

Figure 9:
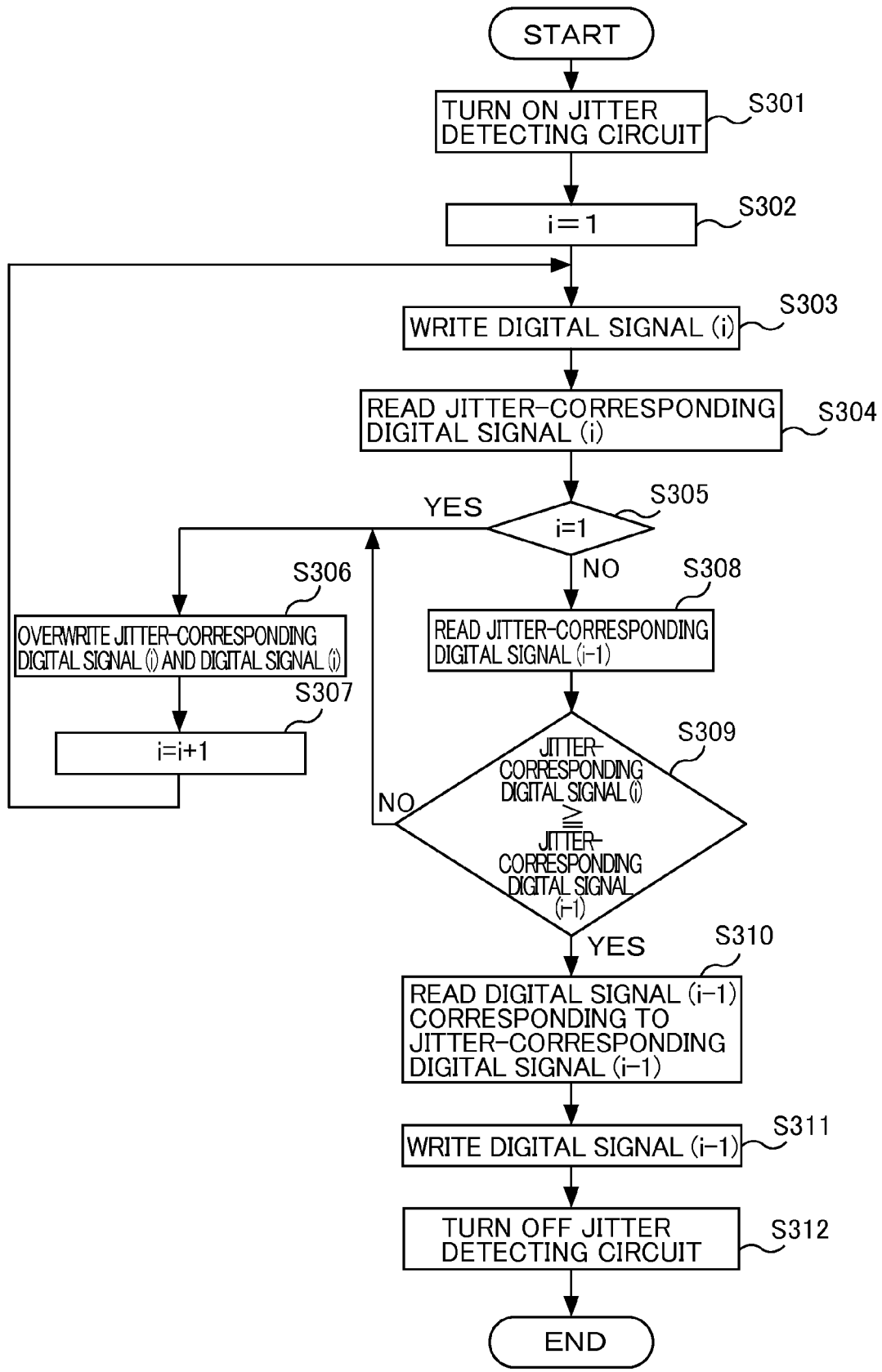
FIG. 9 is a flowchart of other operation of the optical disc signal processing apparatus according to an embodiment of the present invention.

In the above first embodiment, the level (n) of the DC signal C at which the jitter included in the binarized signal is minimized is determined by obtaining the jitter-corresponding digital signals (1) to (21) corresponding respectively to the output DC signals C having the levels (1) to (21). However, it is not limitative. For example, the optical disc signal processing apparatus 6 may be provided so as to execute the operations shown in FIG. 9. FIG. 9 is a flowchart of other operations of the optical disc signal processing apparatus 6 according to an embodiment of the present invention. Other operations of the optical disc signal processing apparatus 6 will be described hereinafter, with reference to FIGS. 6 and 9. The operations in S301 to S304 are similar to those in S101 to S104 shown in FIG. 5 and, therefore, the description thereof is omitted.

When reading the jitter-corresponding digital signal (1) held by the register 14 (S304), the micro computer 15 judges whether the variable i is "1" (S305). When judging that the variable i is "1" (S305•YES), the micro computer 15 writes the jitter-corresponding digital signal (1) corresponding to the digital signal (1) into a predetermined address of the RAM 16 (S306).

The micro computer 15 increments the variable i (S307) and, writes into the register 17 a digital signal (2) corresponding to a level (2) in order to output the DC signal C at the level (2) to the binarizing circuit 5 (S303). When reading the jitter-corresponding digital signal (2) held by the register 14 (S304), the micro computer 15 judges whether the variable i is "1" (S305). At this time, the variable i is "2" and, therefore, the micro computer 15 judges that the variable i is not "1"

(S305•NO) and reads the jitter-corresponding digital signal (1) written in the predetermined address of the RAM 16 by the operation at above S306 (S308). The micro computer 15 judges whether the jitter indicated by the jitter-corresponding digital signal (2) is equal to or more than the jitter indicated by the jitter-corresponding digital signal (1) (S309). In this case, as shown in FIG. 6(b), the magnitude of the jitter included in the binarized signal decreases until the level of the DC signal reaches the level (n), and increases after reaching the level (n). That is, the jitter included in the binarized signal generally describes a curve that has the bottom jitter representing the minimum jitter, as the minimum point. Therefore, the micro computer 15 judges that the jitter indicated by the jitter-corresponding digital signal (2) is not equal to or more than the jitter indicated by the jitter-corresponding digital signal (1) (S309•NO). The micro computer 15 overwrites the jitter-corresponding digital signal (2) corresponding to the digital signal (2) into the predetermined address of the RAM 16, where the jitter-corresponding digital signal (1) corresponding to the digital signal (1) has been written (S306).

By executing the similar operation to the above, a jitter-corresponding digital signal (n) corresponding to the digital signal (n) at which the jitter included in the binarized signal is minimized is overwritten in the predetermined address of the RAM 16 (S306). The micro computer 15 increments the variable i (=n) (S307), and writes into the register 17 a digital signal (n+1) corresponding to a level (n+1) in order to output to the binarizing circuit 5 the DC signal C having a level (n+1) (S303). When reading the jitter-corresponding digital signal (n+1) held by the register 14 (S304), the micro computer 15 judges whether the variable i is "1" (S305). At this time, the variable i is "n+1" and, therefore, the micro computer 15 judges that the variable i is not one (S305•NO), and reads the jitter-corresponding digital signal (n) that has been written in the predetermined address of the RAM 16 by the previous operation in S306 (S308). The micro computer 15 judges whether the jitter indicated by the jitter-corresponding digital signal (n+1) is equal to or more than the jitter indicated by the jitter-corresponding digital signal (n) (S309). In this case, as shown in FIG. 6(b), the magnitude of the jitter included in the binarized signal increases after the level of the DC signal C has reached the level (n) and, therefore, the micro computer 15 judges that the jitter indicated by the jitter-corresponding digital signal (n+1) is equal to or more than the jitter indicated by the jitter-corresponding digital signal (n) (S309•YES). The micro computer 15 reads the digital signal (n) corresponding to the jitter-corresponding digital signal (n) from the predetermined address of the RAM 16 (S310). The micro computer 15 again writes the digital signal (n) into the register 17 (S311). As a result, the DC signal C having the level (n) at which the jitter included in the binarized signal is minimized is output to the binarizing circuit 5. Therefore, the comparing circuit 22 always outputs a binarized signal at which the jitter is minimized. After writing again the digital signal (n), the micro computer 15 outputs to the jitter detecting circuit 12 the signal for stopping the jitter detecting operation of the jitter detecting circuit 12 (S312).

Other operations of the above optical disc signal processing apparatus 6 can be applied to the optical disc signal processing apparatus 61 in the second embodiment.

According to the above other embodiments, during the process of adjusting the level of the DC signal C from the level (1) to the level (21), the level (n) at which the jitter included in the binarized signal is minimized can be adjusted, as the level of the DC signal. That is, by adjusting the level to the next level of (n+1) after the level of the DC signal C has reached the level (n) at which the jitter included in the binarized signal is minimized, it can be judged that the jitter included in the binarized signal is minimized when the DC signal C is at the level (n), so that the level of the DC signal C can be adjusted to the level (n). As a result, the process for adjusting the level of the DC signal C to the level (n) can be executed quickly and the reproduction of information from the optical disc 50 can be started more quickly. Due to the repetition of the overwriting into a predetermined address in the RAM 16, other addresses of the RAM 16 can be used for other processes, etc., and, therefore, the RAM 16 can be used for many purposes.

Other operations of the above optical disc signal processing apparatus 6 can be applied to the optical disc signal processing apparatus 61 in the second embodiment. As a result, during the process of adjusting the level of the DC signal C from the level (1) to the level (21), the level (n) at which the jitter included in the binarized signal is minimized can be adjusted as the level of the DC signal. That is, by adjusting the level to the next level of (n+1) after the level of the DC signal C has reached the level (n) at which the jitter included in the binarized signal is minimized, it can be judged that the jitter included in the binarized signal is minimized when the DC signal C is at the level (n), so that the level of the DC signal C can be adjusted to the level (n). As a result, the process for adjusting the level of the DC signal C to the level (n) can be executed quickly and the reproduction of information from the optical disc 50 can be started more quickly. Due to the repetition of the overwriting into a predetermined address in the RAM 16, other addresses of the RAM 16 can be used for other processes, etc., and, therefore, the RAM 16 can be used for many purposes.

It is claimed:

1. An optical disc signal processing apparatus including a binarizing circuit configured to compare a level of a reference signal and a level of an RF (Radio Frequency) signal which is obtained by photoelectrically converting a reflected light of a laser beam applied to the optical disc and on which a first DC signal is superimposed, to output a binarized signal for reproducing information recorded on an optical disc, the optical disc signal processing apparatus comprising:
    a detecting circuit configured to detect jitter when a level of the DC signal is adjusted to a plurality of different levels, the jitter being fluctuation of the binarized signal on a time axis relative to a reproduction clock generated to be phase-locked to the binarized signal, the detecting circuit configured to charge and discharge a capacitor according to a phase difference between the binarized signal and the reproduction clock and to output a voltage on the capacitor as a first analog signal having a level corresponding to a magnitude of the jitter;
    an AD converter configured to analog-digital convert the first analog signal and output a first digital signal;
    a discriminating circuit configured to output a second digital signal for adjusting a level of the DC signal to the plurality of different levels within a certain range of levels when the first digital signal is input to the discriminating circuit, so as to discriminate the first digital signal for allowing the jitter to be minimized; and
    a DA converter configured to digital-analog convert the second digital signal and output a second analog signal, the binarizing circuit having a level of the DC signal set thereto according to the second analog signal corresponding to the first digital signal for allowing the jitter to be minimized.

2. An optical disc signal processing apparatus of claim 1, wherein
    the discriminating circuit outputs the second digital signal for adjusting a level of the DC signal to the plurality of different levels starting at a level at one side of the certain range of levels and progressively increasing or decreasing the second digital signal to a level at another side of the certain of levels, and wherein the binarizing circuit having a level of the DC signal set thereto according to the second analog signal corresponding to the first digital signal when the jitter is minimized in a process for adjusting a level of the DC signal to the plurality of different levels.

3. An optical disc signal processing apparatus of claim 1, wherein the detecting circuit stops a jitter detecting operation when the discriminating circuit discriminates the first digital signal for allowing the jitter to be minimized.

* * * * *